United States Patent Office 2,823,237
Patented Feb. 11, 1958

2,823,237

PREPARATION OF HIGHLY SOLUBLE PARAFORMALDEHYDE

James F. McCants, Tulsa, Okla., assignor to Pan American Petroleum Corporation, a corporation of Delaware No Drawing. Application May 18, 1954
Serial No. 430,719

4 Claims. (Cl. 260—615.5)

The present invention relates to the preparation of paraformaldehyde and more particularly, it is concerned with a novel method for the preparation of a type of paraformaldehyde which possesses a much greater degree of water solubility than the material produced by current commercial procedures.

The composition of paraformaldehyde may be illustrated by the formula: $Ho \cdot (CH_2O)_n \cdot H$. Depending on the method by which it has been prepared, paraformaldehyde of the prior art contains from about 91 to 99 percent formaldehyde. It has been determined that paraformaldehyde is a mixture of polyoxymethylene glycols containing from 8 to 100 formaldehyde groups per molecule. The fraction of lower polyoxymethylene glycols is generally quite small. Ordinarily, the paraformaldehyde of commerce contains in excess of 12 formaldehyde units per molecule.

Commercial paraformaldehyde is generally prepared by subjecting an aqueous formaldehyde solution of from about 35 to 40 percent strength to distillation and concentration until solidification or precipitation of the polymer occurs. The pasty white product first appearing under such conditions contains about 80 percent formaldehyde. On further drying it yields a crumbly material having a formaldehyde content of about 95–98 percent. Paraformaldehyde produced in this manner is only slightly soluble in water.

Paraformaldehyde is widely used as a source of formaldehyde in a variety of reactions. However, owing to its relatively limited solubility as presently prepared, the reaction mixtures in which it is employed must be heated to rather high temperatures, for example, from 90° to 100° C. in order to force formaldehyde into solution so that it will be free to react. Paraformaldehyde as currently produced generally contains from about 5 to 10 weight percent water. Accordingly, when such material, which is only slightly water soluble, is employed, for example, in the manufacture of various resins, considerable heat must be applied in order to supply free formaldehyde for the reaction. In doing so, however, the water present is converted into steam and some of it is trapped in the resulting resin causing the appearance of bubbles or foggy spots in the finished product.

Accordingly, it is an object of my invention to provide a type of paraformaldehyde which possesses a substantially increased tendency to dissolve in the common solvents, particularly water. It is another object of my invention to prepare a highly water-soluble form of paraformaldehyde by subjecting a methanol solution of formaldehyde, containing not more than about 10 weight percent water, to evaporation under controlled conditions of temperature and pressure. It is still another object of my invention to produce highly soluble anhydrous paraformaldehyde.

In carrying out my invention, a methanol solution of formaldehyde (35 to 40 percent) containing not more than about 10 weight percent water is subjected to vacuum distillation at a vapor temperature not in excess of about 35° C. and at a maximum pressure of about 200 mm. Ordinarily the vapor temperature may range from about 10° C. to about 35° C. and the pressure may vary from about 10 mm. at 10° C. to about 200 mm. at about 35° C. By effecting removal of methanol under such conditions, the tendency of the dissolved formaldehyde to form larger, relatively insoluble molecules is substantially reduced. Also, because of the low initial water content of the original mixture, relatively little water combines chemically with the resulting polymer, thereby giving a final product having exceptionally good solubility characteristics. In this connection, it has been my observation that the chief reasons for the poor solubility of paraformaldehyde produced in accordance with previously known methods have been due to the fact that the concentration step occurred at relatively high temperature, causing extensive polymerization of the formaldehyde, resulting in a highly stable product of low water solubility.

Starting mixtures of the type suitable for use in my process may be obtained merely by dissolving gaseous formaldehyde in methanol. Or if desired, paraformaldehyde of commerce may be dissolved in methanol with the aid of heat and thereafter subjecting the resulting solution to the conditions set forth above. Likewise, a suitable starting mixture may be secured in accordance with the procedure described in my patent, U. S. 2,565,569. By the method there described, an aqueous solution of formaldehyde is fractionally distilled in the presence of a methanol reflux at a pressure sufficient to cause the temperature at the top of the fractionating column to remain above about 80 C. Under these conditions, a solution of formaldehyde in methanol is taken overhead and contains from about 20 to about 60 percent formaldehyde, depending on the strength of the initial aqueous formaldehyde solution. Less than 5 percent water is usually present in this overhead fraction.

The process of my invention may be further illustrated by the following specific example:

EXAMPLE

A 40 percent solution of formaldehyde in methanol containing less than 5 percent water and having an acid content of 0.05 percent, calculated as formic acid, was subjected to vacuum distillation at a pressure of 60 mm. resulting in vapor overhead temperature of about 12° C. Distillation was continued until a solid white product remained which on analysis indicated a formaldehyde content of 94 weight percent. The water solubility of the product thus prepared was next compared with eight different samples of paraformaldehyde manufactured by other methods. In carrying out the solubility tests, 20 grams of each sample were added to 40 grams of water in 4 oz. stoppered bottles. The resulting individual solutions were then allowed to stand at 25° C. for a period of 48 hours. During this time, the bottles were periodically shaken. At the end of the test period, the aqueous slurries were filtered and the formaldehyde content of the various filtrates determined. The various paraformaldehyde samples tested were ground, if necessary, and screened to pass a 200-mesh sieve. The results obtained are indicated in the table below.

Table

| Paraformaldehyde Sample | Grams HCHO | Grams H₂O | Wt. Percent HCHO in Liquid After 48 Hrs. Contact Time |
|---|---|---|---|
| Sample A [1] | 20 | 40 | 3.0 |
| Sample B [1] | 20 | 40 | 3.4 |
| Sample C [1] | 20 | 40 | 3.4 |
| Sample D (Flake) [1] | 20 | 40 | 2.8 |
| Sample D (Powder) [1] | 20 | 40 | 3.2 |
| Sample E [1] | 20 | 40 | 3.5 |
| Sample F [1] | 20 | 40 | 3.8 |
| Sample G [2] | 20 | 40 | 6.7 |
| Sample H [3] | 20 | 40 | 11.6 |

[1] Commercially available product.
[2] Product produced in accordance with U. S. 2,565,569.
[3] Produced in accordance with the present invention.

The material produced by the process of my invention (Sample H) contained no high molecular weight residue that would not readily dissolve in boiling water. On the other hand, all of the commercial samples of paraformaldehyde were only slowly soluble in the boiling water and some had relatively high percentages of material which were insoluble after remaining in boiling water for a period of four hours. The high solubility of paraformaldehyde produced in accordance with the process of my invention is attributed primarily to two factors: (1) the substitution of methanol for water in the final product and (2) the extremely low formation temperature employed.

The water content of the product may be controlled by the amount thereof in the charge fed to the vacuum distillation operation, the water in the finished product being proportional to the quantity present in the feed. Likewise, it is possible, by the process of my invention, to obtain highly soluble paraformaldehyde containing small amounts of water, e. g., 5 weight percent merely by adjusting the water content of the formaldehyde-methanol solution to the desired value, subjecting said solution to distillation in accordance with my invention, and securing a solid product containing water. Such product is highly soluble because it is formed at relatively low temperature, i. e., not above about 35° C. It is apparent that the preparation of paraformaldehyde in this manner constitutes a distinct advantage over prior art methods, involving concentration of aqueous formaldehyde solutions, because with the latter, in order to reduce the water content to the desired level, higher temperatures are required to remove the excess water than are necessary for the removal of methanol.

I claim:

1. In a process for the preparation of paraformaldehyde possessing a substantially increased tendency to dissolve in water and other common solvents therefor, the step which comprises subjecting a solution of formaldehyde in methanol containing not more than about 10 weight percent water to distillation at an overhead temperature of from about 10° C. to about 35° C. at a pressure of from about 50 mm. to about 200 mm.

2. In a process for converting paraformaldehyde having a solubility in water not in excess of about 3.8 weight percent at about 25° C. over a period of about forty-eight hours into a product having substantially greater water solubility, the improvement which comprises dissolving in methanol, the paraformaldehyde of lower water solubility and thereafter subjecting the resulting solution to distillation at an overhead temperature in the top of the distillation column ranging from about 10° to about 35° C. at a pressure of from about 50 mm. to about 200 mm.

3. In a process for the preparation of paraformaldehyde possessing a substantially increased tendency to dissolve in water and other common solvents therefor, the step which comprises subjecting a solution of formaldehyde in methanol containing not more than about 10 weight percent water to distillation at an overhead temperature in the top of the distillation column of from about 10° C. to about 35° C. at a pressure of from about 50 mm. to about 200 mm. until a solid white pulverulent residue appears.

4. In a process for preparing substantially anhydrous paraformaldehyde having solubility in water substantially greater than 3.5 weight percent at 25° C., the improvement which comprises dissolving anhydrous formaldehyde in dry methanol and thereafter subjecting the resulting solution to distillation at an overhead temperature of from about 10° to 35° C. at a pressure of from about 50 mm. to about 200 mm.

References Cited in the file of this patent

UNITED STATES PATENTS

| | | |
|---|---|---|
| 2,527,654 | Pyle et al. | Oct. 31, 1950 |
| 2,527,655 | Pyle et al. | Oct. 31, 1950 |
| 2,565,569 | McCants | Aug. 28, 1951 |
| 2,665,241 | Willke et al. | Jan. 5, 1954 |
| 2,675,346 | Maclean | Apr. 13, 1954 |
| 2,676,143 | Lee et al. | Apr. 20, 1954 |
| 2,690,992 | McCants | Oct. 5, 1954 |

OTHER REFERENCES

Walker: Formaldehyde, 2nd ed. (1953), page 126.